United States Patent [19]

Ochiai

[11] Patent Number: 5,067,127
[45] Date of Patent: Nov. 19, 1991

[54] CONGESTION AVIDANCE CONTROL SYSTEM AND METHOD FOR COMMUNICATION NETWORK

[75] Inventor: Tamiya Ochiai, Hachioji, Japan

[73] Assignee: Kabushiki Kaisha Toshiba, Kawasaki, Japan

[21] Appl. No.: 584,660

[22] Filed: Sep. 19, 1990

[30] Foreign Application Priority Data

Sep. 21, 1989 [JP] Japan .................................. 1-246104

[51] Int. Cl.⁵ ............................................. H04Q 11/04
[52] U.S. Cl. ..................................... 370/58.1; 370/95.1
[58] Field of Search .................... 370/58.1, 58.2, 58.3, 370/60, 60.1, 94.1, 94.2, 94.3, 95.1, 95.3

[56] References Cited

U.S. PATENT DOCUMENTS

| | | | |
|---|---|---|---|
| 4,442,502 | 4/1984 | Friend et al. | 370/58.2 |
| 4,491,947 | 1/1985 | Frank | 370/95.3 |
| 4,757,496 | 7/1988 | Bartholet et al. | 370/95.1 |
| 4,757,497 | 7/1988 | Beierle et al. | 370/94.3 |

*Primary Examiner*—Douglas W. Olms
*Assistant Examiner*—Wellington Chin
*Attorney, Agent, or Firm*—Finnegan, Henderson, Farabow, Garrett & Dunner

[57] ABSTRACT

A congestion avoidance control system and method for a communication network for determining one of routes between a plurality of communication terminals connected to a plurality of exchanges in turn interconnected by a plurality of lines to establish a tandem connection while relieving call congestion to a specific exchange and minimizing the occurrence of cell loss. For each of the relay lines, a resistive value indicative of a reciprocal of a ratio of a relay line residual capacity to an intra-network line full capacity is set and multiplied by a relay line load value to obtain a route load value of the relay line to prepare an output-line residual-capacity minimum-cost vector table. Further, an application data to be issued from an outgoing terminal includes a cost value allowable for communication route between the outgoing and incoming terminals, in which case each of the exchanges selects one of the routes forming minimum cost lines of maximum one of line residual capacity classes satisfying a request use capacity issued from the outgoing terminal and having a minimum cost value in an allowable cost range of the application data issued from the outgoing terminal. Furthermore, the application data to be issued from the outgoing terminal includes a terminal priority level set for the outgoing terminal of the incoming exchange, in which case each of the exchanges has a line T level table in which possible or impossible call registration is stored for line residual capacities with respect to each line and terminal priority level and selects one of the route forming minimum cost lines of the line residual capacity classes associated with the terminal priority level.

13 Claims, 14 Drawing Sheets

| INCOMING EXCHANGE | RESIDUAL CAPACITY CLASS | MINIMUM COST | MINIMUM COST LINE NO. |
|---|---|---|---|
| | | | TBMCC |
| Nj | CLASS 1 | $C_{Nj,C1}$ | $L_{X1}$ |
| | CLASS 2 | $C_{Nj,C2}$ | $L_{X2}$ |
| | CLASS 3 | $C_{Nj,C3}$ | $L_{X3}$ |
| | CLASS 4 | $C_{Nj,C4}$ | $L_{X4}$ |
| | CLASS 5 | $C_{Nj,C5}$ | $L_{X5}$ |
| | ⋮ | ⋮ | ⋮ |
| ⋮ | ⋮ | ⋮ | ⋮ |

FIG. 2
*(PRIOR ART)*

MINIMUM COST VECTOR

| INCOMING EXCHANGE | LINE RESIDUAL CAPACITY CLASS | MINIMUM COST VALUE |
|---|---|---|
| Nj | CLASS 1 | $C_{Nj,Li,C1}$ |
| | CLASS 2 | $C_{Nj,Li,C2}$ |
| | CLASS 3 | $C_{Nj,Li,C3}$ |
| | CLASS 4 | $C_{Nj,Li,C4}$ |
| | CLASS 5 | $C_{Nj,Li,C5}$ |
| | ⋮ | ⋮ |
| ⋮ | ⋮ | ⋮ |

FIG. 6
*(PRIOR ART)*

| CLASS NO. | LINE RESIDUAL CAPACITY RANGE | MEANING |
|---|---|---|
| CLASS 0 | $0 \leq Q < B_1$ | UNREGISTRABLE |
| CLASS 1 | $B_1 \leq Q < B_2$ | FOR TERMINAL REQUEST LESS THAN $B_1$ |
| CLASS 2 | $B_2 \leq Q < B_3$ | FOR TERMINAL REQUEST LESS THAN $B_2$ |
| CLASS 3 | $B_3 \leq Q < B_4$ | FOR TERMINAL REQUEST LESS THAN $B_3$ |
| CLASS 4 | $B_4 \leq Q < B_5$ | FOR TERMINAL REQUEST LESS THAN $B_4$ |
| CLASS 5 | $B_5 \leq Q < B_6$ | FOR TERMINAL REQUEST LESS THAN $B_5$ |
| ⋮ | ⋮ | ⋮ |

FIG. 3(a)
*(PRIOR ART)*

| RESIDUAL CAPACITY CLASS | RESIDUAL CAPACITY RANGE |
|---|---|
| CLASS 1 | $1 \leq Q < 2$ |
| CLASS 2 | $2 \leq Q < 4$ |
| CLASS 3 | $4 \leq Q < 8$ |
| CLASS 4 | $8 \leq Q < 10$ |
| CLASS 5 | $10 \leq Q$ |

FIG. 3(b)
*(PRIOR ART)*

TBMCL

| INCOMING EXCHANGE | RESIDUAL CAPACITY CLASS | LINE L1 | ---- | LI | ---- | LL |
|---|---|---|---|---|---|---|
| Nj | CLASS 1 | $C_{Nj,L1,C1}$ | | $C_{Nj,LI,C1}$ | | $C_{Nj,LL,C1}$ |
| | CLASS 2 | $C_{Nj,L1,C2}$ | | $C_{Nj,LI,C2}$ | | $C_{Nj,LL,C2}$ |
| | CLASS 3 | $C_{Nj,L1,C3}$ | | $C_{Nj,LI,C3}$ | | $C_{Nj,LL,C3}$ |
| | CLASS 4 | $C_{Nj,L1,C4}$ | | $C_{Nj,LI,C4}$ | | $C_{Nj,LL,C4}$ |
| | CLASS 5 | $C_{Nj,L1,C5}$ | | $C_{Nj,LI,C5}$ | | $C_{Nj,LL,C5}$ |

FIG. 7
*(PRIOR ART)*

TBMCLk

| INCOMING EXCHANGE | RESIDUAL CAPACITY CLASS | MINIMUM COST VALUE |
|---|---|---|
| Nj | CLASS 1 | $C_{Nj,C1}$ + LINE $L_k$ LOAD VALUE |
| | CLASS 2 | $C_{Nj,C2}$ + LINE $L_k$ LOAD VALUE |
| | CLASS 3 | $C_{Nj,C3}$ + LINE $L_k$ LOAD VALUE |
| | CLASS 4 | $C_{Nj,C4}$ + LINE $L_k$ LOAD VALUE |
| | CLASS 5 | $C_{Nj,C5}$ + LINE $L_k$ LOAD VALUE |

FIG. 8
*(PRIOR ART)*

| INCOMING EXCHANGE | RESIDUAL CAPACITY CLASS | MINIMUM COST VALUE | TBMCLk | | |
|---|---|---|---|---|---|
| ... | | | | | |
| Nj | CLASS 1 | CNj, C1 +(LINE Lk LOAD VALUE) * : (LINE Lk RESIDUAL CAPACITY/INTRA-NETWORK LINE FULL CAPACITY ) ** (-1) : | | | |
| | CLASS 2 | CNj, C2 +(LINE Lk LOAD VALUE) * : (LINE Lk RESIDUAL CAPACITY/INTRA-NETWORK LINE FULL CAPACITY ) ** (-1) : | | | |
| | CLASS 3 | CNj, C3 +(LINE Lk LOAD VALUE) * : (LINE Lk RESIDUAL CAPACITY/INTRA-NETWORK LINE FULL CAPACITY ) ** (-1) : | | | |
| | CLASS 4 | CNj, C4 +(LINE Lk LOAD VALUE) * : (LINE Lk RESIDUAL CAPACITY/INTRA-NETWORK LINE FULL CAPACITY ) ** (-1) : | | | |
| | CLASS 5 | CNj, C5 +(LINE Lk LOAD VALUE) * : (LINE Lk RESIDUAL CAPACITY/INTRA-NETWORK LINE FULL CAPACITY ) ** (-1) : | | | |
| ... | | | | | |

\* INDICATES MULTIPLICATION
\*\* INDICATES POWER

FIG. 10

| T LEVEL | TERMINAL REQUEST ALLOWABLE RESIDUAL CLASS |
|---|---|
| LEVEL 1 | UNREGISTRABLE FOR TERMINAL REQUEST ABOVE CLASS $Cm_1$ |
| LEVEL 2 | UNREGISTRABLE FOR TERMINAL REQUEST ABOVE CLASS $Cm_2$ |
| LEVEL 3 | UNREGISTRABLE FOR TERMINAL REQUEST ABOVE CLASS $Cm_3$ |
| ⋮ | |

CONGESTION AVIDANCE CONTROL SYSTEM AND METHOD FOR COMMUNICATION NETWORK

BACKGROUND OF THE INVENTION

1. Field of the Invention

The present invention relates to a congestion avoidance control system and method for a communication network, which, when it is desired to realize a tandem connection between various sorts of terminals connected through a plurality of exchanges and lines according to a route decision method for minimizing a communication cost, can relieve a call congestion to specific one of the exchanges to minimize the generation of a call loss.

2. Description of the Related Art

FIG. 1 shows a system configuration for explaining a prior art route decision method, in which a tandem connection between an outgoing terminal 100 and an incoming terminal 102 is carried out by selecting one of two routes, that is, one route leading from the outgoing terminal 100 to the incoming terminal 102 through an exchange 110, a line 120, an exchange 111, a line 121 and an exchange 112, and the other route leading from the terminal 100 to the terminal 102 through the exchange 110, a line 122, an exchange 113, a line 123 and the exchange 112.

The exchanges 110 to 113, which form a relay route for transmission of communication data, include connection type packet exchanges, connection type line exchanges, connection type asynchronous transfer mode exchanges and the like exchanges.

These sorts of exchanges 110 to 113 have respectively such a minimum cost table TBMCC as shown in FIG. 2 wherein a residual line capacity corresponding to its own full line capacity minus a line capacity being now used is divided into a plurality of different classes by predetermined capacity units and a line number $L_x$ providing a minimum cost from its own exchange to an incoming exchange (corresponding to the exchange 112 in the case of FIG. 1) is stored. The system selects one of routes leading from the outgoing terminal 100 to the incoming terminal 102 by making reference to the table TBMCC.

In FIG. 2, reference symbol $N_j$ denotes the number of an incoming exchange, $[CN_j, Cm]$ expressed in the form of $[CN_j, C1]$, $[CN_j, C2]$ and so on denotes a minimum cost for every line residual capacity class at the time of a tandem connection to the incoming exchange $N_j$, and $L_{xm}$ expressed in the form of $L_{x1}$, $L_{x2}$ and so on denotes a line number providing a minimum cost to the line residual capacity class Cm.

The line residual capacity class Cm is, as shown in FIG. 3(a), expressed as divided into a plurality of stages of $0 \leq Q < B1$, $B1 \leq Q < B2$, $B2 \leq Q < B3$ and so on corresponding to divisions of a line capacity Q by predetermined capacity units. For example, in class 1 corresponding to Cm=1, tandem connection can be carried out for a line capacity q less than the residual capacity B1.

Assume now that the line residual capacity class Cm is divided as shown in FIG. 3(b). Then a total cost $CE_x$ for a relay connection of an exchange $E_x$ and a relay line $L_i$ is expressed as follows.

$$CE_x = \alpha + \gamma$$

where $\alpha$ represents a cost for each exchange $E_x$ when an exchange processing load and so on are taken into consideration and $\gamma$ represents a cost required for the route of the relay line $L_i$ (for example, $\beta \times DL_i$ for a distance $DL_i$, where $\beta$ is a distance cost coefficient).

More in detail, for example, when the processing cost $\alpha$ of the relay exchange $E_x$ is "0", the route cost (load) $\gamma$ for each line in the system of FIG. 1 is written as follows.

Line 120: $\gamma = 5$
Line 121: $\gamma = 5$
Line 122: $\gamma = 10$
Line 123: $\gamma = 10$ When the request line capacity q of the outgoing terminal 100 is 2 and the line residual capacities Q of the lines 120 to 123 are as follows, Line 120: Q=2
Line 121: Q=2
Line 122: Q=5
Line 123: Q=5 and further when attention is directed to a route data of residual capacity class 2 for the incoming exchange 112, minimum cost tables 131-1, 132 and 130 stored in the exchanges 111, 113 and 110 have such data as shown in the respective tables in FIG. 1.

From the data of these tables, it will be appreciated that, when a calling request corresponding to residual capacity class 2 is issued, the system may select the line $L_2$ (refer to the table 131-1) providing a minimum cost "5" from the exchange 111 to the exchange 112, the line $L_1$ (refer to the table 132) providing a minimum cost "10" from the exchange 113 to the exchange 112, and the line $L_1$ (refer to the table 130) providing a minimum cost "5+5" from the exchange 110 to the exchange 112.

Assuming now that a calling request having a line request capacity q is issued from the outgoing terminal 100 in the system of FIG. 1, then each of the exchanges 110 to 113 executes such a route deciding procedure as shown in FIG. 4. More specifically, each exchange first retrieves the minimum cost table TBMCC for each line residual capacity class and extracts the minimum cost line number $L_x$ corresponding to the line residual capacity class satisfying the line request capacity q (step 400).

Next, the exchange determines the minimum cost line $L_x$ as a minimum cost route leading to the incoming terminal 102 (step 410) and sends the calling request to the adjacent exchange connected downstream of the line $L_x$ (step 420).

The adjacent exchange, when receiving the calling request, carries out the same processing as the above and determines a minimum cost route leading to the incoming terminal 102.

More concretely, when a calling request having a line request capacity q=2 is issued from the outgoing terminal 100 to the incoming terminal 102, the exchange 110 selects the line L1 (line 120) corresponding to line residual capacity class 2 satisfying the line request capacity q=2 on the basis of the data of the minimum cost table 130.

The exchange 111 located downstream of the exchange 110 then selects the line L2 (line 121) corresponding to the line residual capacity class 2 on the basis of the data of the minimum cost table 131-1.

As a result, the outgoing terminal 100 is connected to the incoming terminal 102 via a route of exchange 110→ line 120→ exchange 111→ line 121 exchange 112.

In this way, in the prior art route decision system, so long as a route satisfying the line request capacity of the outgoing terminal 100 is present, the outgoing terminal 100 and the incoming terminal 102 are interconnected via the route.

In order to realize such a route deciding procedure as mentioned above, it is necessary for each exchange to confirm the line residual capacity of the adjacent exchange and to prepare such a minimum cost table TBMCC for each line residual capacity class as shown in FIG. 2.

Explanation will next be made as how to prepare the minimum cost table TBMCC.

FIG. 5 is a flowchart showing the procedure of preparing the minimum cost table TBMCC, wherein two conditions (refer to step 530) are set as its procedure start timing when each line is varied in residual capacity or load and when constant period timing is provided.

When one exchange receives a calling request from an outgoing terminal and relays it to an exchange located downstream thereof, the downstream exchange is subjected to a change in the line capacity by an amount corresponding to the relay.

If the capacity change is large in such an extent that the line residual capacity class is to be shifted to another class, then the downstream exchange sends onto the input line $L_i$ of the upstream exchange such a minimum cost vector for the management of input line residual capacity showing a minimum cost value $CN_j$, $L_i$, Cm for each residual capacity class of lines leading to the incoming exchange $N_j$ as shown in FIG. 6.

The upstream exchange, when receiving the minimum cost vector for the management of input line residual capacity (step 500), updates to the then received minimum cost value [$CN_j$, $L_i$, Cm] the minimum cost value of the input line $L_i$ in an every-line minimum cost table TBMCL (refer to FIG. 7) showing the minimum cost values for all lines leading to the incoming exchange $N_j$ for different line residual capacity classes (step 510).

Then the exchange compares the minimum cost values listed in the column direction of the every-line minimum cost table TBMCL, extracts the line number $L_x$ for minimum cost connection to the incoming exchange $N_j$ and the associated minimum cost value for each line residual capacity class, and prepares such a minimum cost table TBMCC showing minimum costs for different line residual capacity classes as shown in FIG. 2 (step 520).

Thereafter, when the contents of the table TBMCC are changed, the exchange adds the current load values of all the lines $L_k$ except for the input line $L_i$ to the minimum cost values of all the lines $L_k$ and prepares such an output-line residual-capacity minimum-cost vector table $TBMCL_k$ as shown in FIG. 8 (steps 530 and 540).

Even when the contents of the table TBMCC are not changed, the processing of the step 540 is carried out in the constant-period data exchange timing mode.

In this constant-period timing mode, it goes without saying that the current load values of all the lines containing the input line $L_i$ are added.

Thereafter, the exchange sends the contents of the table $TBMCL_k$ (FIG. 8) prepared in the aforementioned manner onto the output line $L_k$ as a output-line residual-capacity minimum cost vector (step 550).

In this way, by discriminating minimum cost values for different line residual capacity classes of mutually adjacent exchanges through such data exchange and selecting a minimum cost route, the system can dynamically judge a minimum cost route to the incoming terminal while following variations in the loads of the exchanges.

In accordance with such prior art route decision procedure, for example, in the system of FIG. 1, when a calling request having a request capacity of 2 is generated from the outgoing terminal 100 and is to be sent therefrom to the incoming terminal 102, the calling request is determined to be sent from the outgoing terminal 100 to the incoming terminal 102 via a route of exchange 110→ line 120→ exchange 111→ line 121→ exchange 112, as already explained above.

In this case, after call setting between the outgoing and incoming terminals 100 and 102 is completed, the residual capacity classes of the lines 120 and 121 forming the then determined route are both decreased to class 1.

When this is considered from the viewpoint of data, the minimum cost table of the exchange 111 corresponds to a table 131-2 of the incoming exchange 112 relating to residual capacity class 2, which means that a minimum cost line from the exchange 111 to the exchange 112 corresponding to residual capacity class 2 is not present.

Under such a condition, if a calling request having a request capacity q=2 is issued from the outgoing terminal 101 to the incoming terminal 103, then the system cannot select any route and thus the calling request will result in a call loss at the exchange 111, since there is no route between the outgoing exchange 111 and incoming exchange 112 (since the minimum cost table of the exchange 111 is as shown by the table 131-2).

As will be clear from the system configuration of FIG. 1, the outgoing terminal 101 can have only the line 121 in order to be connected with the incoming terminal 103, and in other words, the terminal 101 has no route selection.

Accordingly, the line 121 must previously be left for communication between the outgoing and incoming terminals 101 and 103.

In spite of such a requirement, this sort of prior art route decision system has paid attention only to the line residual capacity and been arranged so that a minimum cost line is selected with no consideration paid at all to the secured route for such a terminal that is impossible to realize a route to the incoming terminal without selection of the mere line (such as the line 121), e.g., the route of the outgoing terminal 101.

For this reason, the prior art route decision system has had such a trouble that, when calling requests are converged on a particular exchange, this causes a call loss to be increased so that the system tends to be put to its congestion state, thereby impeding the effective operation of the system.

In the aforementioned prior art route decision system, in this way, when a calling request is issued from an outgoing terminal to an incoming terminal, the system selects minimum cost one of possible routes of lines which lead from the outgoing exchange to the incoming exchange and which line residual capacities satisfy the request capacity of the outgoing terminal.

This, after the completion of a call setting, results in that the residual capacities of lines forming the selected route are decreased by an amount corresponding to the request capacity of the outgoing terminal. At this time, when the residual capacity of any one of the lines forming the minimum cost route corresponds nearly to the request capacity of the outgoing terminal, the residual capacity of that line forming the selected minimum cost route becomes substantially zero during communication through the selected route.

Under such a condition, if an calling request having a request capacity beyond the residual capacity of that line forming the relay route is issued from a terminal connected to the associated exchange in the relay route, then even the selection of that line disables the setting of a route. In addition, when the request issuing terminal cannot secure any other route without that line, the calling request from the outgoing terminal inevitably results in a call break and a call loss.

In this way, the prior art route decision system has had such a problem that, since no consideration is taken at all to securing a route for such a terminal that cannot set a route to an incoming terminal without selection of such a line, a call loss frequently takes place and the system tends to be put in the congestion state, thus resulting in that the system cannot be efficiently operated.

SUMMARY OF THE INVENTION

In view of such circumstances, it is an object of the present invention to provide a congestion avoidance control system which can determine one of routes while taking into account the acquisition of a secured route for a communication request to be issued from a terminal connected to an exchange in a relay route being now used, whereby the occurrence of a call loss can be minimized, thus contributing to the efficient operation of the system.

The congestion avoidance control system in accordance with the present invention determines one of possible routes according to three methods which follow.

In the first method, a resistive value expressed by the following equation (A) is set for a relay line and then added with a route load value of the relay line according to the following equation (B) to prepare an output-line residual-capacity minimum-cost vector table $TBMCL_k$.

Relay line resistive value = {(Relay line residual capacity)/(Intra-network line full capacity)}$^{-1}$ (A)

Relay line route load value = (B)
(Relay line load value) × (Relay line resistive value)

In the second method, each outgoing terminal has a function of informing an outgoing exchange of, at the time of issuing a calling request, an application data including, in addition to a request capacity, one of cost values allowable for a route between the outgoing and incoming terminals, and when the calling request having said application data is issued from the outgoing terminal, each of the relay exchanges up to the incoming terminal and associated with route decision selects one of the routes forming minimum cost lines of maximum one of the line residual capacity classes satisfying the request use capacity of the outgoing terminal and having a minimum cost value in a range of the allowable cost values contained in the application data issued from the outgoing terminal.

In the third method, each outgoing terminal has a function of informing an outgoing exchange of, at the time of issuing a calling request, the application data including, in addition to a request capacity and a cost value allowable for communication between the outgoing and incoming terminals, one of a plurality of terminal priority levels (T levels) set for the outgoing terminal with respect to the incoming exchange, each of the exchanges has a line T level table in which possible or impossible call registration is stored for line residual capacities with respect to each line and line residual capacity and selects one of the routes forming minimum cost lines of one of the line residual capacity classes associated with the T level of the application data issued from the outgoing terminal. In this case, preparation of a minimum cost table is extended by preparing an input cost vector, an every-line cost table TBMCL, a minimum cost table TBMCC and an output cost vector for each T level.

According to the first method of the present invention, the relay line resistive value varies depending on the magnitude of the relay line residual capacity. More specifically, a value x of (relay line residual capacity)/(intra-network line full capacity) in the equation (A) satisfies a relation $0 \leq x \leq 1$ and the value x is set to have a larger value for the larger line residual capacity. Thus the relay line resitive value, which is a reciprocal of the value x, becomes smaller for the larger line residual capacity.

As will be seen from the equation (B), the route load value (cost value) of the relay line is obtained by multiplying the relay line fixed load value fixedly determined by the relay line by the above relay line resistive value. Therefore, the aforementioned property of the relay line resistive value reflects on the calculation result of the equation (B), that is, the larger the line residual capacity is the lower the cost is. As a result, the relay line having a smaller residual capacity is less selected as a route line.

In other words, in the first method of the present invention, since a relay line having a large residual capacity is preferentially selected as a route line between the outgoing and incoming terminals, the relay line having a small residual capacity is not selected and left for a single route connection between the outgoing and incoming terminals, so that, even when a calling request is generated from such a terminal, route selection can be realized without causing any call loss.

In the second method of the present invention, further, a request use capacity and a cost value allowable between the outgoing and incoming terminals are informed as the application data (calling data) from the outgoing terminal to an outgoing exchange, and the outgoing exchange, when recognizing the calling request having the application data, selects one of relay routes of lines between the outgoing and incoming terminals having maximum residual capacities in the allowable cost value range informed from the outgoing terminal.

For this reason, as the allowable cost value is set to be higher for example, relay route lines having larger residual capacities are selected, so that a line having a smaller residual capacity tends to easily be left and not to be used for a single route connection between the outgoing and incoming terminals.

The first method is effective only within a certain range of the relay line fixed load value range, but the second method can secure lines having small residual capacities even in a range beyond the above-mentioned certain range of relay line fixed load value, so that, even when a calling request is issued from such a terminal that cannot realize setting of a route between the outgoing and incoming terminals without selection of only that line, that line can be selected as one of the route lines and the occurrence of call loss can be suppressed with less frequency of the call loss occurrence.

According to the third method, further, data on possible or impossible registration of terminal priority levels (T levels) for each relay line are arranged in the minimum cost table of each relay exchange, and each of the relay exchanges, when accepting from an outgoing terminal a calling request having the prescribed application data, i.e., a request use capacity and a terminal priority level, sequentially selects one of lines of the route up to the incoming terminal allowable for the terminal priority level and having line residual capacities satisfying the then request capacity and prevents a calling request issued from a terminal having a request capacity of a predetermined value or more to flow through a relay line that is connected to such a terminal that cannot realize setting of a route between the outgoing and incoming terminals without selection of only that line.

For this reason, for example, in the case where the terminal priority level of the terminals that cannot realize setting of a route between the outgoing and incoming terminals without selection of only that line is set large while the terminal priority level of the terminals that can realize setting of a route between the outgoing and incoming terminals without selection of that line is set small, when the residual capacity of the relay line becomes small, the system can establish a relay connection not including that line for such a communication request between terminals that can realize setting of a route without that line, and thereafter even when a communication request is issued from such a terminal that cannot realize setting of a route between the outgoing and incoming terminals without selection of only that line, the system can select the route without occurring call loss.

The second method has also a limitation in the effect of securing a line having a small residual capacity in case where the absolute residual capacity is small, but the third method becomes more effective in such a case.

In this way, the congestion avoidance control system of the present invention can reliably secure a line having a small residual capacity stepwise by selectively using optimum one or ones of the first to third methods according to the system configuration to be employed, can suppress the occurrence of call loss to a minimum extent while dispersing a call congestion to a specific exchange and thus can efficiently avoid the congestion condition.

The congestion avoidance control system of the present invention based on the first method is arranged so that, as already mentioned above, there is provided a minimum cost table wherein the relay line fixed load value is multiplied by a weight determined by the line residual capacity and a relay line having a relatively small residual capacity provides a relatively high cost. As a result, it becomes difficult for the system to select a line having a small residual capacity. For example, when a communication request is issued from such a terminal connected to one of exchanges in a relay route that cannot realize setting of a route between the outgoing and incoming terminals without selection of only one line, the system can reliably secure the line and can reduce the frequency of call loss to a large extent.

Under such a network configuration condition that even the first method cannot avoid, the second method is employed to select ones of route lines having maximum residual capacities in the allowable cost range on the basis of the calling data issued from the outgoing terminal and including a request capacity and an allowable cost value. As a result, it can be more difficult for the system to less select a line having a smaller residual capacity by setting the allowable cost value higher and thus the frequency of occurrence of call loss can be further reduced.

Further, in the event where it is impossible to avoid the occurrence of call loss even with use of the first and second methods, the third method is employed to select, on the basis of a calling data issued from the outgoing terminal and including a request capacity and a terminal priority level, minimum cost ones of lines of routes up to the incoming terminal with respect to residual capacity classes satisfying the request capacity and allowing for the terminal priority level. As a result, for example, when a inter-terminal communication to be registered is previously set for a relay line to be possibly considered congested, the line for the inter-terminal communication can be reliably reserved regardless of the network configuration conditions and the like and call loss can be reduced to a substantially zero level.

Any combination of the first, second and third methods can be realized.

These methods can ensure the stepwise acquisition of a line having a small residual capacity and when optimum one of these methods is selected depending on the network configuration and the values of constants of lines, the system can be efficiently operated with less generation of call loss. In addition, these methods are effective, in particular, in applying to voice data transmission requiring minimum call loss, e.g., requiring immediateness or to congestion avoidance control at the time of route decision of an exchange including a plurality of terminals having different transmission rates.

BRIEF DESCRIPTION OF THE DRAWINGS

FIG. 2 is an example of a minimum cost table used in the prior art system;

FIGS. 3(a) and 3(b) show tables for explaining set conditions for line residual capacity classes in the prior art system;

FIG. 6 shows an example of an input line cost vector in the prior art;

FIG. 7 shows an example of an every-line input-line cost vector table in the prior art;

FIG. 8 shows an example of an output line cost vector in the prior art;

FIG. 10 shows an example of an output line cost vector in the first embodiment of the present invention;

DESCRIPTION OF THE PREFERRED EMBODIMENTS

Embodiments of the present invention will be detailed by referring to the accompanying drawings.

Figure 9:
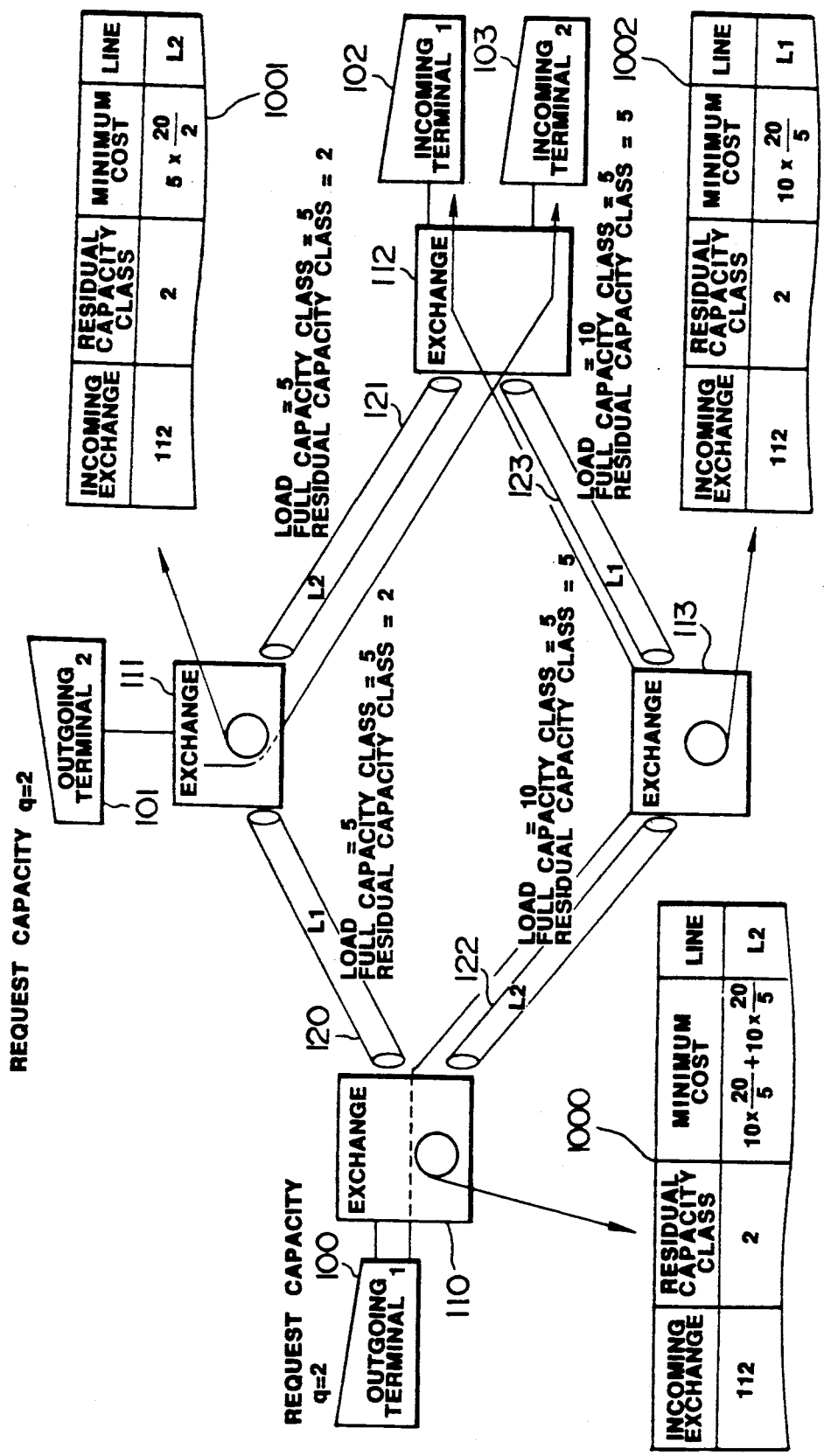
FIG. 9 is a configuration of a congestion avoidance control system based on relay line resistive value in accordance with a first embodiment of the present invention.

Referring first to FIG. 9, there is shown a configuration of a system in accordance with a first embodiment of the present invention, which employs a route decision method based on relay line resistive value to avoid a congestion condition.

Shown in FIG. 10 is an example of an output line cost vector which is used in the first embodiment of the present invention and which is utterly different from that of the prior art system in the line load value to be added for each line in the column "Minimum Cost Value".

Figure 5:
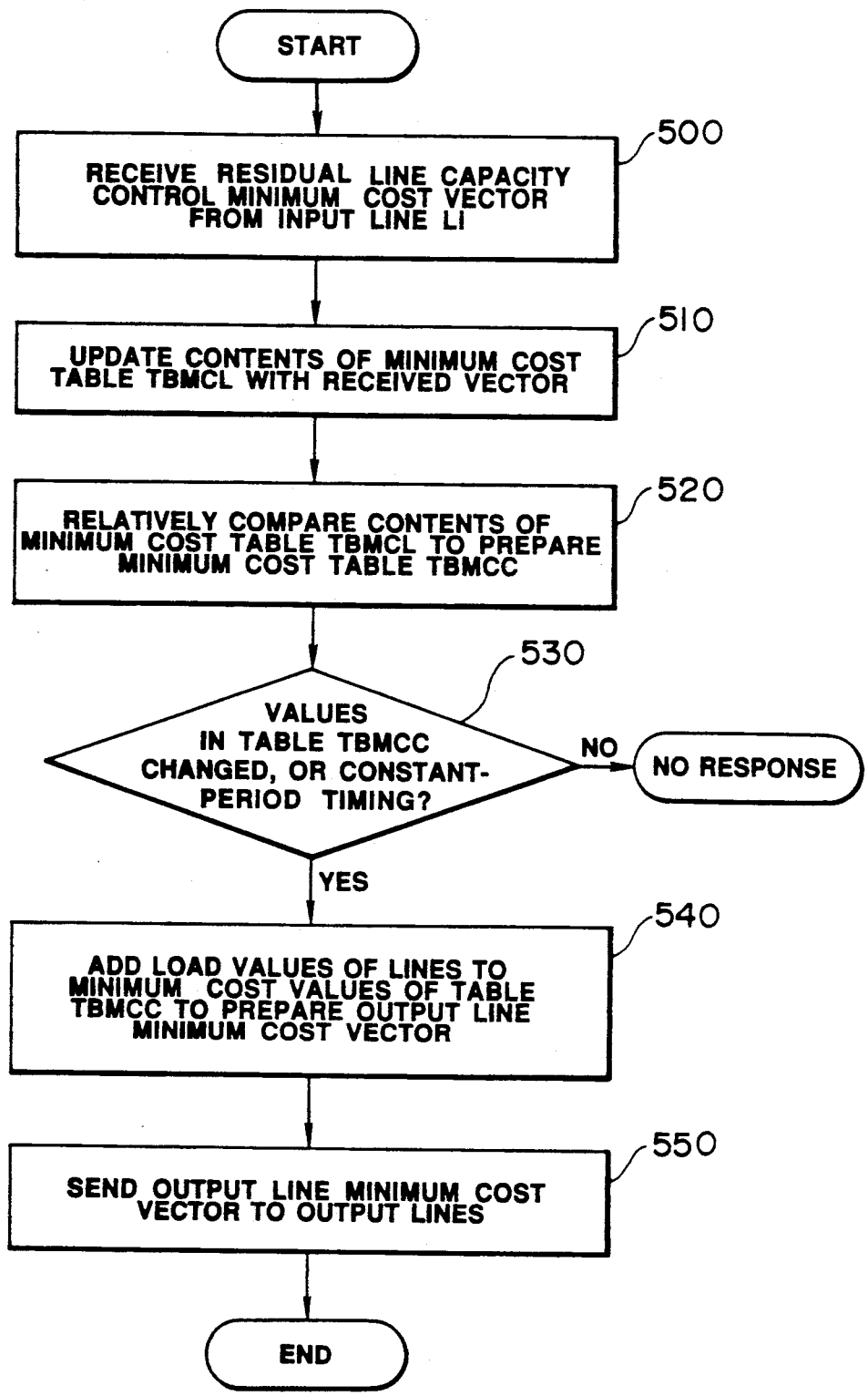
FIG. 5 is a flowchart showing a procedure for preparing the minimum cost table in the prior art.

In the minimum cost vector in accordance with the present invention, in the step 540 (of preparing an output line minimum cost vector) of the procedure of preparing the minimum cost table TBMCC shown in FIG. 5 in the prior art system, in place of the load value for each line to be added to the minimum cost value of the table TBMCC, a relay line route load value calculated according to the above equations (A) and (B) is added thereto.

In FIG. 9, minimum cost tables 1000 to 1002 show only major parts of minimum cost tables TBMCC prepared on the basis of the above output line minimum cost vector in the respective exchanges 110 to 113, and respectively store therein a minimum cost value for each residual capacity class and a line number corresponding to the minimum cost value with respect to the incoming exchange 112.

Figure 1:
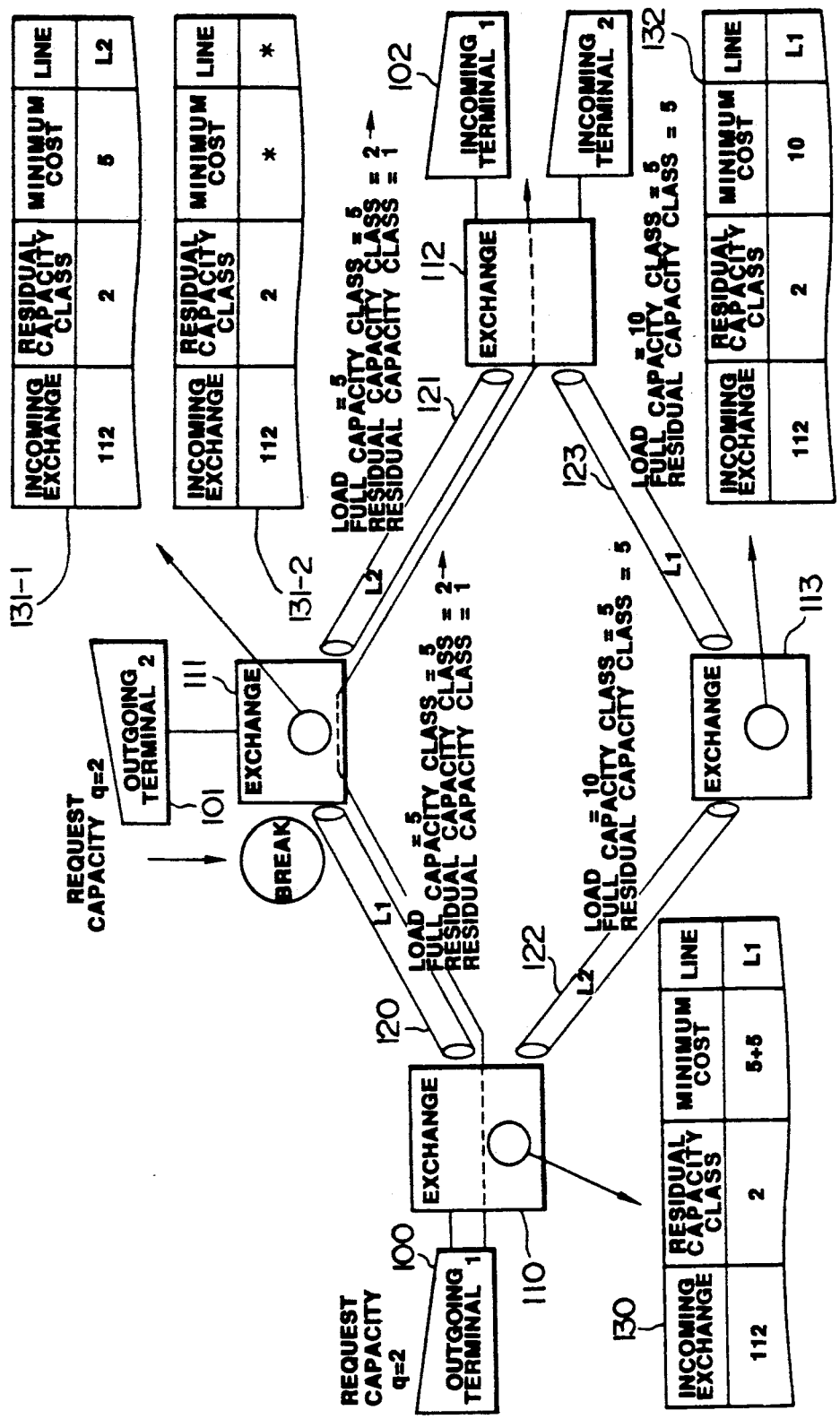
FIG. 1 is a configuration of a prior art route decision system.

The network configuration of the system of FIG. 9, the load values, full capacity classes and residual capacity classes of respective lines are set to have the same values as those explained in FIG. 1.

Any congestion condition can be avoided under exactly the same conditions as in the system of FIG. 1. This is because a relay line route load value to be added for each line to obtain a minimum cost value is obtained according to the equations (A) and (B) at the time of preparing the above output line minimum cost vector.

As will be appreciated from the equations (A) and (B), a relay line fixed load value is multiplied by a weight (relay line resistive value) determined by the line residual capacity and a minimum cost table showing smaller relay line residual capacities with higher costs is presented in the present invention.

With such an arrangement, it becomes difficult for a line having a smaller residual capacity to be selected. Thus, even for a communication request issued from such a terminal connected to an exchange in a relay route that cannot establish a route without selecting the above small residual capacity line, that line can be reliably secured and the generation of a call loss can be reduced in frequency.

Now attention will be directed to the minimum cost tables TBMCC of the exchanges 110 to 113, in particular, to residual capacity class 2 with respect to the incoming exchange 112, and explanation will be made as to the contents of these tables.

First, with respect to the exchange 111, a minimum cost is "5×20/2" according to the above equations (A) and (B) and a line L2 (line 121) is presented (refer to the table 1001).

With respect to the exchange 113, next, a minimum cost is "10×20/5" and a line L1 (line 123) is presented (refer to the table 1002).

With respect to the exchange 110, a cost value "5×20/2+10×20/5" from the line L1 (line 120) and a cost value "10×20/5+10×20/5" from the line L2 (line 122) are input and smaller one of the cost values, i.e., "10×20/5+10×20/5" is selected as a minimum cost value, and also the line L2 (line 122) is presented as a minimum cost line (refer to the table 1000).

Figure 4:
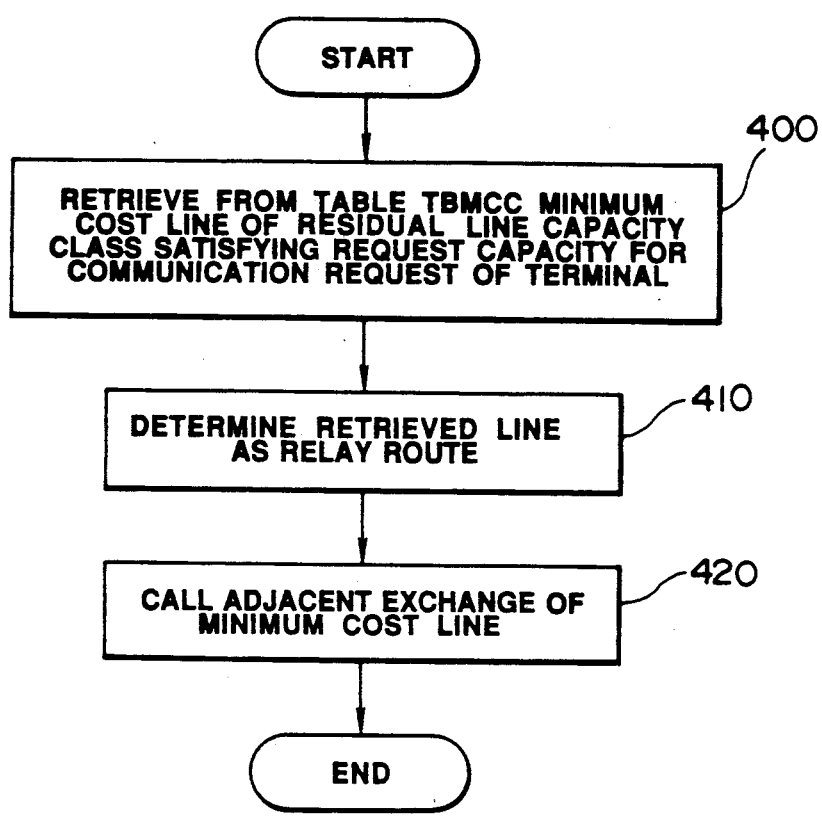
FIG. 4 is a flowchart showing a route decision procedure in the prior art system.

Under such conditions, if a calling request having a line request capacity of 2 is issued from the outgoing terminal 100 to the incoming terminal 102, then the processing of the system is carried out according to the flowchart of the route decision procedure of FIG. 4. That is, the system retrieves minimum cost lines satisfying residual capacity class 2 from the minimum cost tables TBMCC of the respective relay exchanges (step 400) and selects one of routes, i.e., outgoing terminal 100→ exchange 110→ line 122→ exchange 113→ line 123→ exchange 112→ incoming terminal 102 (steps 410 and 420).

During relay line communication through the thus selected route, if a calling request having a line request capacity of 2 is issued from the outgoing terminal 101 to the incoming terminal 103, then the system can select a route of outgoing terminal 101→ exchange 111→ line 121→ exchange 112→ incoming terminal 103 without any call loss, since the contents of the minimum cost table 1001 of the exchange 111 with respect to the route from the exchange 111 to the exchange 112 are not changed by the issuance of the second calling request.

In the first embodiment of the present invention, since the relay line resistive value is multiplied by the relay line fixed load value to reduce the cost of a relay line having a large line residual capacity, inevitable selection of a line having a small residual capacity can be prevented. In the case where the relay line fixed load value exceeds a certain range, however, it becomes impossible to keep low the cost of a relay line having a large line residual capacity and thus to exhibit a call loss preventing effect.

When a congestion condition cannot be avoided even in the first embodiment, a second embodiment is effective, which will be explained below.

Figure 11:
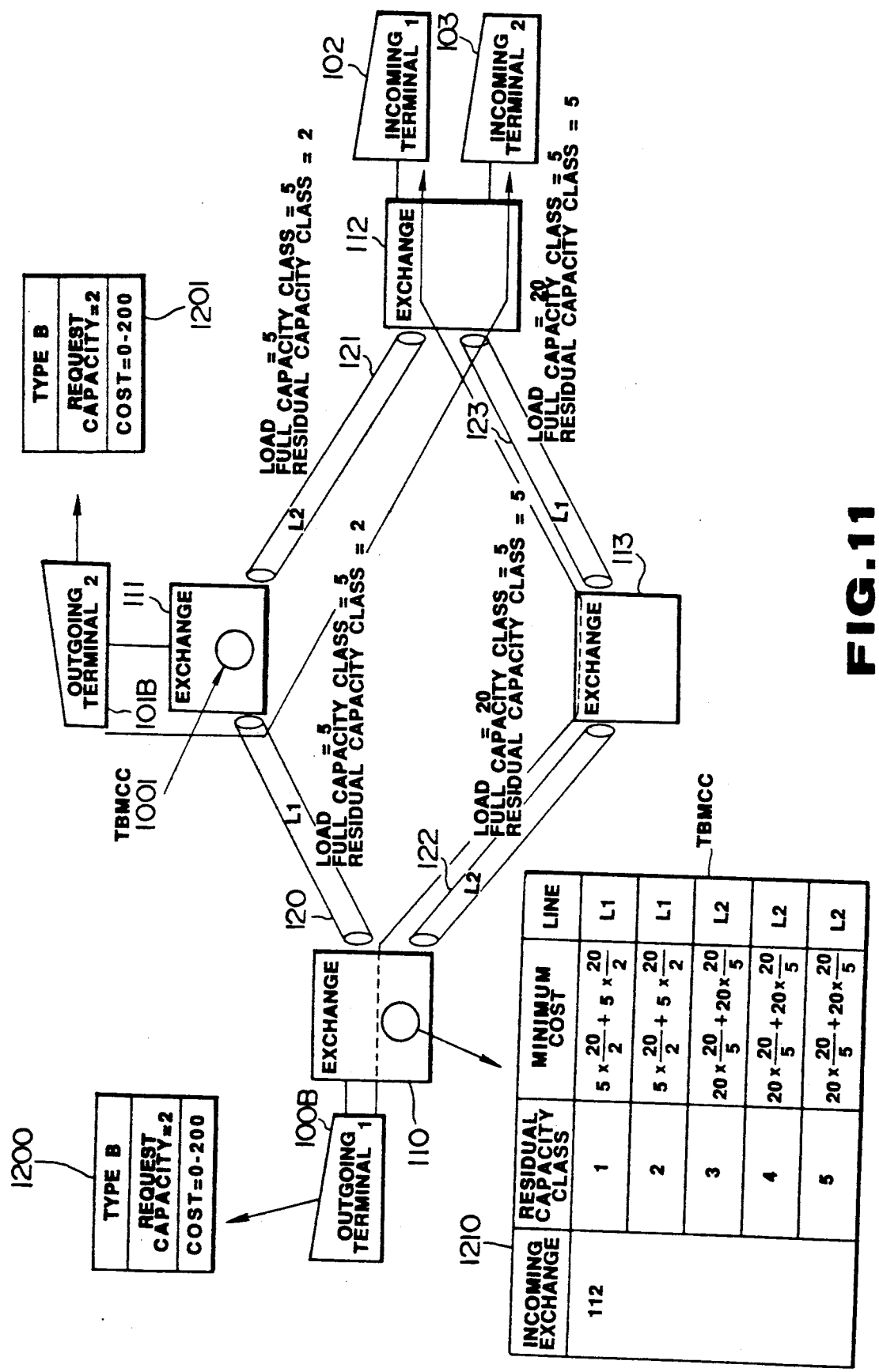
FIG. 11 is a configuration of a congestion avoidance control system based on allowable cost value in accordance with a second embodiment of the present invention.

FIG. 11 shows a configuration of a system in accordance with the second embodiment of the present invention, which employs a route decision method based on an allowable cost value informed from an outgoing terminal in order to avoid the congestion condition.

In FIG. 11, tables 1200 and 1201 show application data of calling messages sent from a B type of terminals peculiar to this system, that is, from terminals 100B and 101B to the exchanges 110 and 111, the application data including an allowable route load value (cost value), in addition to the request capacity of an ordinary terminal.

Figure 12:
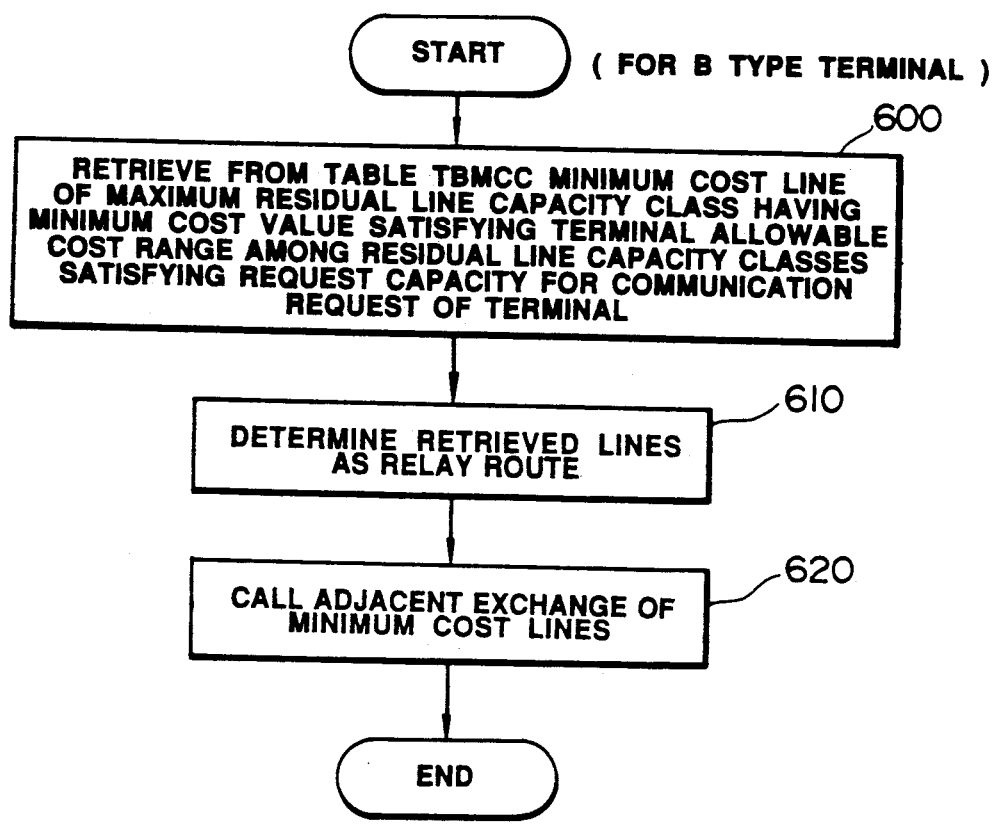
FIG. 12 is a flowchart showing a route determining procedure in the second embodiment of the present invention.

Shown in FIG. 12 is a route decision procedure in the second embodiment of the present invention, wherein, due to the use of the B type terminals, the processing of the step 400 in the route decision procedure of the prior art system of FIG. 4 is replaced by the processing of a step 600.

The second embodiment introduces the conception of the relay line resistive value as in the first embodiment in order to prepare the minimum cost table TBMCC and an addition value calculated according to the above equations (A) and (B) is added for each line in order to obtain a minimum cost value.

In the system of FIG. 1, however, although the values of the full capacity classes and residual capacity classes of the respective lines are set to have the same values as in the system of FIG. 9, the load values of the lines 122 and 123 are set to be 20 and 20 that are different from those in the system of FIG. 9 and correspondingly, the minimum cost values become different from those in the previous embodiment.

Explanation will be made as to the actual operation of the second embodiment and, in particular, as to the contents of the minimum cost tables TBMCC to be prepared in the respective exchanges as well as the specific operation of route section from an outgoing terminal to an incoming terminal.

Attention will first be directed to the minimum cost tables TBMCC of the exchanges 110 to 113 with respect to the residual capacity class to the incoming exchange 112, and explanation will be made of the prepared contents of the tables.

In the table of the exchange 111, a minimum cost value of "5×20/2" calculated according to the above equations (A) and (B) and the line L2 (line 121) are presented for residual capacity class 2 or less.

In the table of the exchange 113, a minimum cost value of "20×20/5" and the line L1 (line 123) are presented for residual capacity class 5 or less.

With respect to the exchange 110, a minimum cost value of "5×20/2+5×20/2" for residual capacity class 2 or less as well as a minimum cost value of "20×20/5+20×20/5" for residual capacity class 5 or less are input as minimum cost vector values from the lines L1 (line 120) and L2 (line 122), respectively.

The exchange 110 prepares a minimum cost table 1210 on the basis of the input-line minimum-cost vector values, in which table, the line L1 (line 120) as a minimum cost line is listed to have a minimum cost value "5×20/5+5×20/5=100" for residual capacity classes 1 and 2 and the line L2 (line 122) as a minimum cost line is listed to have a minimum cost value "20×20/5+20×20/5=160" for residual capacity classes 3, 4 and 5.

Under such a condition, if a calling request having a line request capacity of 2 and an allowable cost of 0-200 is issued from the outgoing terminal 100B to the incoming terminal 102, then each of the exchanges executes its processing according to the flowchart of the route decision procedure of FIG. 12. More specifically, the system retrieves the route data of one 5 of the residual capacity classes 2 to 5 which satisfies the line request capacity 2 and the allowable cost 0-200 in the respective relay exchanges from the table TBMCC (step 600), and select one of routes, that is, outgoing terminal 100B→ exchange 110→ line 122→ exchange 113→ line 123→ exchange 112→ incoming terminal 102 (steps 610 and 620).

During communication through the relay lines of the thus-selected route, when a calling request having a line request capacity of 2 and an allowable cost of 0-200 is issued from the outgoing terminal 101B to the incoming terminal 103, the system can select a route of outgoing terminal 101B→ exchange 111→ line 121→ exchange 112→ incoming terminal 103 without causing any call loss, since this does not affect the contents of the minimum cost table 1001 of the exchange 111 relating to the route from the exchange 111 to the exchange 112.

Under such line load conditions that the load values of the lines 122 and 123 are both increased from 10 to 20, when the first embodiment based on the relay line resistive value is applied, the route between the outgoing and incoming terminals 100B and 102 can be selected but the route between the outgoing and incoming terminals 101B and 103 cannot be secured as in the prior art; whereas, when the second embodiment taking the allowable cost into account is applied, the route including the lines 122 and 123 can be selected while the line 121 is left for communication between the outgoing and incoming terminals 101B and 103 which can have merely a single communication route of the line 121, whereby a possible call loss caused by the communication between the terminals 101B and 103 can be reliably eliminated.

However, such effective operation of the second embodiment as mentioned above inevitably requires the presence of a multiplicity of lines having sufficiently large line residual capacities, and thus such second embodiment system as not to satisfy this requirement cannot easily eliminate a congestion condition.

Under such a condition that even the use of the first and second embodiments disables the avoidance of a congestion condition, a third embodiment to be explained later is effective.

Figure 13:
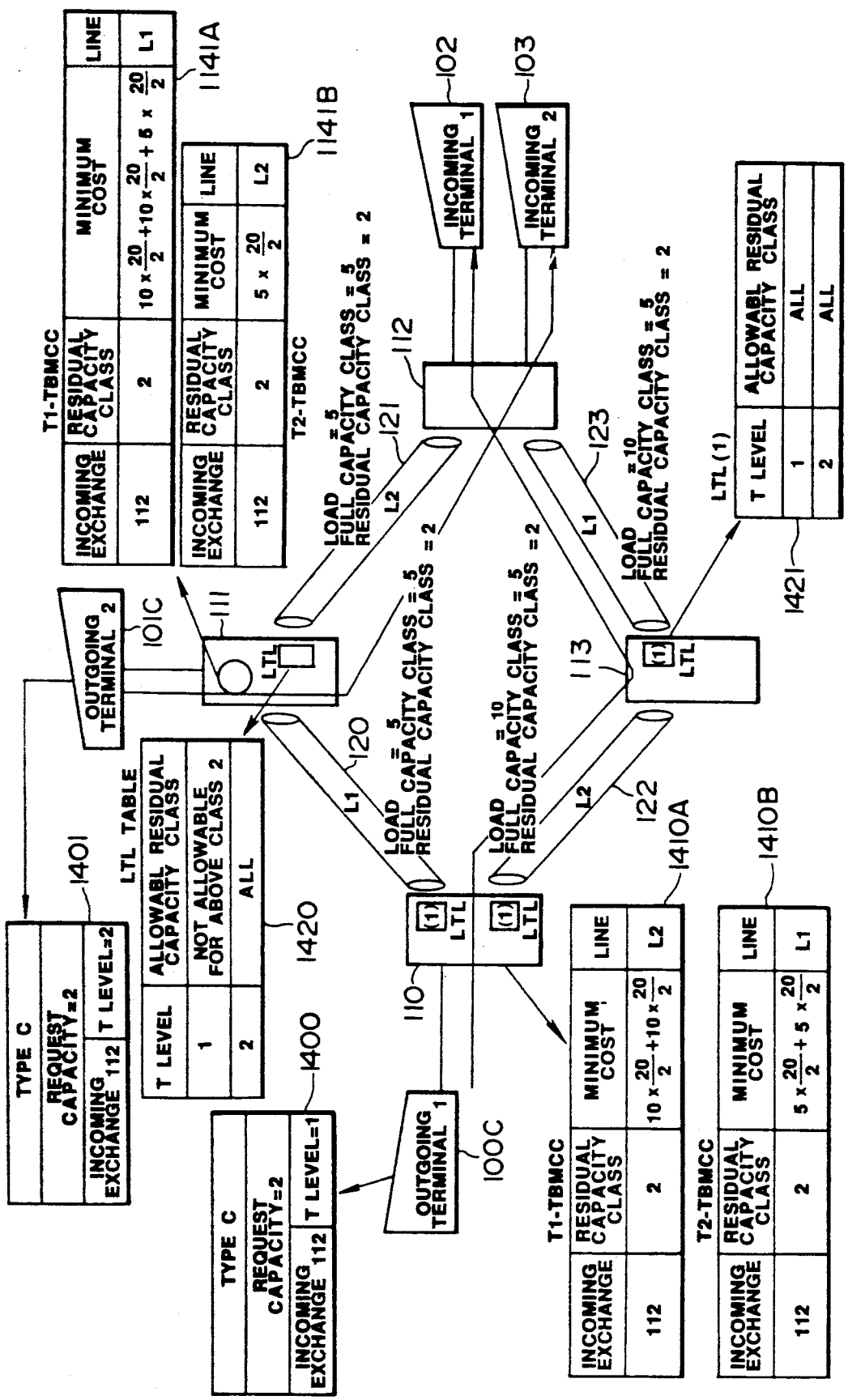
FIG. 13 is a configuration of a congestion avoidance control system based on terminal priority level in accordance with a third embodiment of the present invention.

There is shown in FIG. 13 a configuration of a system in accordance with the third embodiment of the present invention, which employs a route decision method based on a terminal priority level informed from an outgoing terminal for the purpose of avoiding a congestion condition.

In FIG. 13, tables 1400 and 1401 show application data of calling messages sent from a C type of terminals peculiar to this system, that is, from terminals 100C and 101C to the exchanges 110 and 111, the application data including a terminal priority level, in addition to the request capacity of an ordinary terminal.

Figures 14, 15:
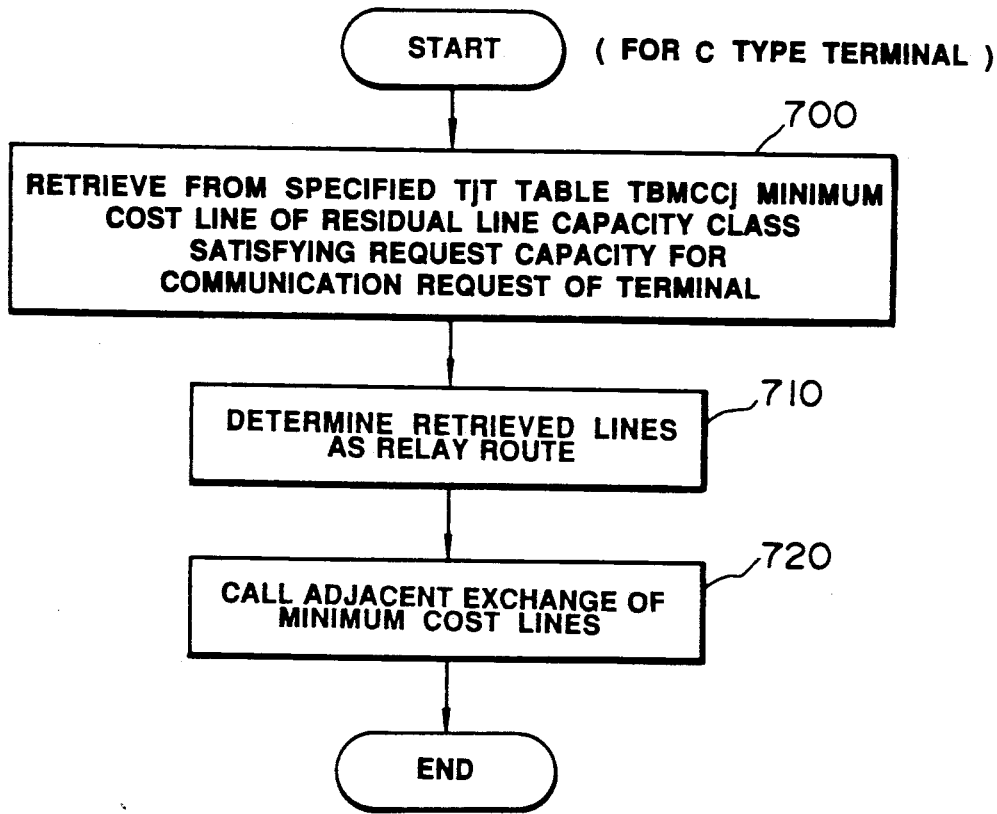
FIG. 14 shows an example of a T level table in the third embodiment.
FIG. 15 is a flowchart showing a route decision procedure in the third embodiment of the present invention.

The terminal priority level (T level) indicates a use priority on whether or not the associated terminal can be registered with respect to the relay lines forming a route to the incoming terminal, and the T level is stored in each of the exchanges in such a form as shown in FIG. 14.

FIG. 14 is an $L_k TL$ table showing $T_j T$ levels registrable for each relay line, indicating that the terminal of each $T_j T$ level can be registered when the residual capacity of the line is larger than that of class $C_{mj}$.

Referring to FIG. 15, there is shown a flowchart which shows a route decision procedure in the third embodiment of the present invention. This route decision procedure is different from that of the prior art in that, when a calling message (application data) including a request capacity and a $T_jT$ level is informed from a C type of terminal (at the time of accepting an incoming call), the exchange retrieves from a minimum cost table $TBMCC_j$ one of minimum cost lines of a route to the incoming terminal allowable for the $T_jT$ level of the calling message (step 700), and selects the route (steps 710 and 720).

Figure 16:
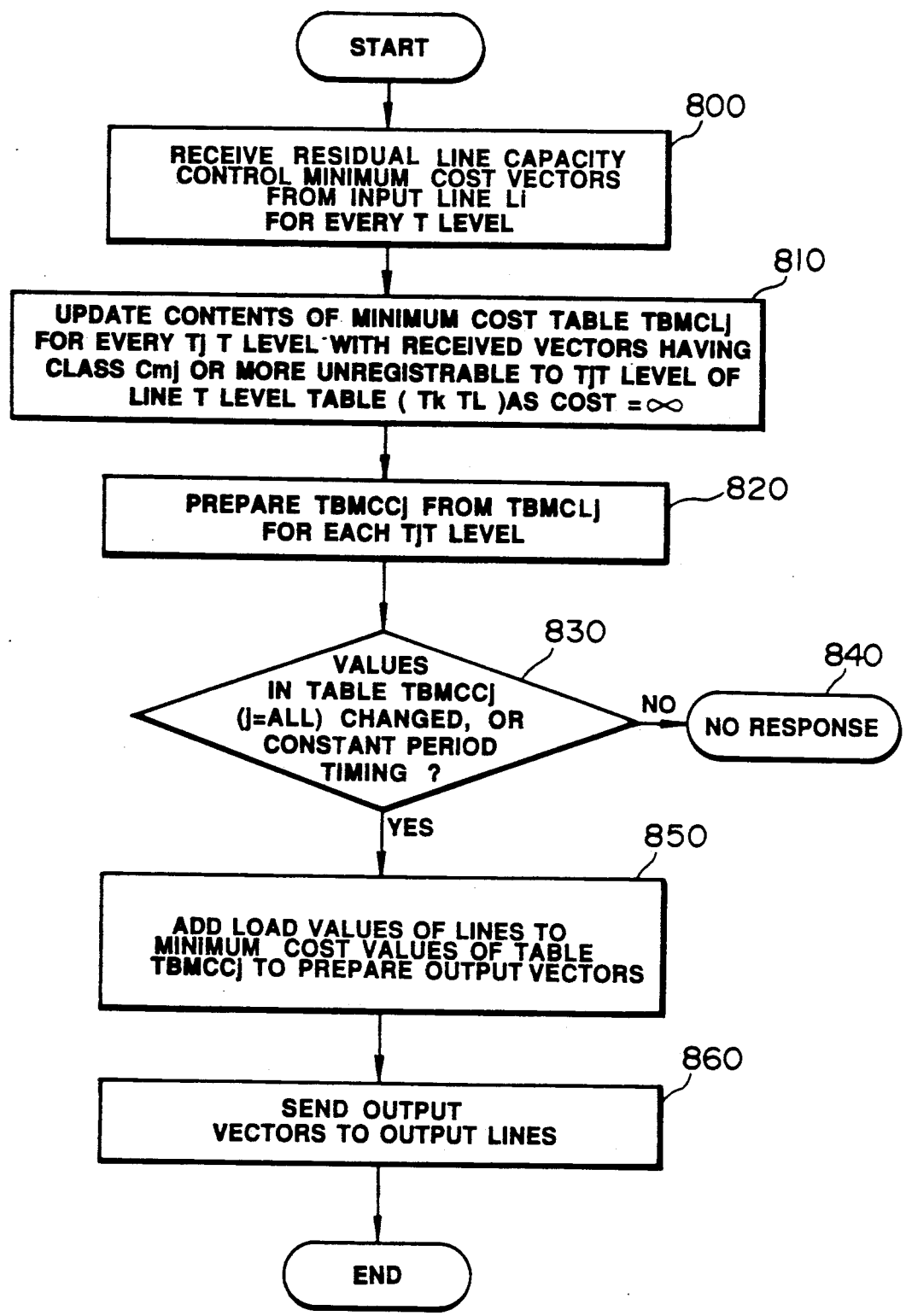
FIG. 16 is a flowchart showing a procedure for preparing a minimum cost table in the third embodiment of the present invention.

In the present invention, such route decision is realized by preparing the minimum cost table $TBMCC_j$ according to such a procedure as shown by a flowchart in FIG. 16.

This minimum cost table preparing procedure is different from that of the prior art system in that such steps of processing or preparing an input cost vector, an every-line minimum cost table, a minimum cost vector, and an output cost vector for every T level (steps 800 to 860).

In addition to the above steps, in a step (step 810) of modifying the every-line minimum cost table $TBMCL_j$ on the basis of the input cost vector, the cost value of a residual capacity class having an unregistrable input cost vector value for every T level is also modified to be ∞ according to the $L_kTL$ table.

Explanation will next be made, as a specific example, as to the contents of the minimum cost tables $TBMCC_j$ of different $T_jT$ levels prepared in the respective exchanges and with respect to the incoming exchange 112 and residual capacity class 2 and also as to the route deciding operation based thereon in the system of FIG. 13.

For convenience of explanation, in the system of FIG. 13, the $T_jT$ levels are limited to only two levels of 1 and 2, registrable residual capacity classes 2 and more cannot be allowed only for a $T_jT$ level of 1 in an LTL table of the line 121 (refer to a table 1420), and in the other LTL tables, the contents can be all registered for all the T levels (refer to a table 1421).

Under such a condition, since the exchange 111 has the LTL table of $T_jT$ level 1 unregistrable for terminals of allowable residual capacity classes 2 and more and also has a residual capacity class of 2, the minimum cost table T1-TBMCC of the exchange 111 corresponds to a table 1411A; while, since the exchange 111 has the LTC table of $T_jT$ level 2 registrable for all terminals, the minimum cost table T2-TBMCC of the exchange 111 corresponds to a table 1411B.

In the exchange 113, a minimum cost value of "10×20/2" for both $T_jT$ levels 1 and 2 and the line L1 (line 123) are stored.

With respect to the exchange 110, at the $T_jT$ level 1, a cost vector value of "10×20/2+10×20/2+5×20/2+5×20/2" is input from the line L1 (line 120) and a cost vector value of "10×20/2+10×20/2" is input from the line L2 (line 122), so that the exchange 110 has a table 1410A stored as the minimum cost table T1-TBMCC having a minimum cost value of "10×20/2+10×20/2" for the line L2 (line 122). At the $T_jT$ level 2, on the other hand, the exchange 110 similarly has a table 1410B as the minimum cost table T2-TBMCC having such contents stored as illustrated.

Under such a condition, if a calling request having a line request capacity of 2 and a $T_jT$ level of 1 is issued from the outgoing terminal 100C to the incoming terminal 102, then each of the exchanges executes its processing and selects one of routes according to a flowchart of the route decision procedure of FIG. 15 and on the basis of the contents of residual capacity class 2 of the minimum cost table T1-TBMCC. As a result, the system can select one of routes, that is, outgoing terminal 100C→ exchange 110→ line 122→ exchange 113→ line 123→ exchange 112→ incoming terminal 102.

During communication through the relay lines of the thus-selected route, when a calling request having a line request capacity of 2 and a $T_jT$ level of 2 is issued from the outgoing terminal 101C to the incoming terminal 103, the system can select a route of outgoing terminal 101C→ exchange 111→ line 121→ exchange 112→ incoming terminal 103 without causing any call loss, since this does not affect the contents of the minimum cost table T2-TBMCC of the exchange 111 relating to the exchange 112.

In the system of FIG. 13, the loads and residual capacity classes of the lines 122 and 123 are changed to be both 10 and 2, though the corresponding values of the lines 122 and 123 are set to be both 20 and 5 in the system of FIG. 11. Under such conditions, when the first embodiment based on the relay line resistive value or the embodiment of FIG. 11 informing the allowable cost is applied, the route between the outgoing and incoming terminals 100C and 102 can be selected but a communication request for the route between the outgoing and incoming terminals 101C and 103 results in a call loss as in the prior art; whereas, when the third embodiment providing the minimum cost table taking the terminal priority level into account as mentioned above is applied, the line 121 is securely left for communication between the outgoing and incoming terminals 101C and 103 which can have merely a single communication route of the line 121, whereby a possible call loss caused by the communication between the terminals 101C and 103 can be reliably eliminated.

Further, the system configuration of FIG. 13 may be arranged so that an outgoing terminal informs an allowable cost value and route decision is carried out by both of the second and third methods. A system having such a configuration as mentioned above is shown in FIG. 17 as another embodiment.

Figure 17:
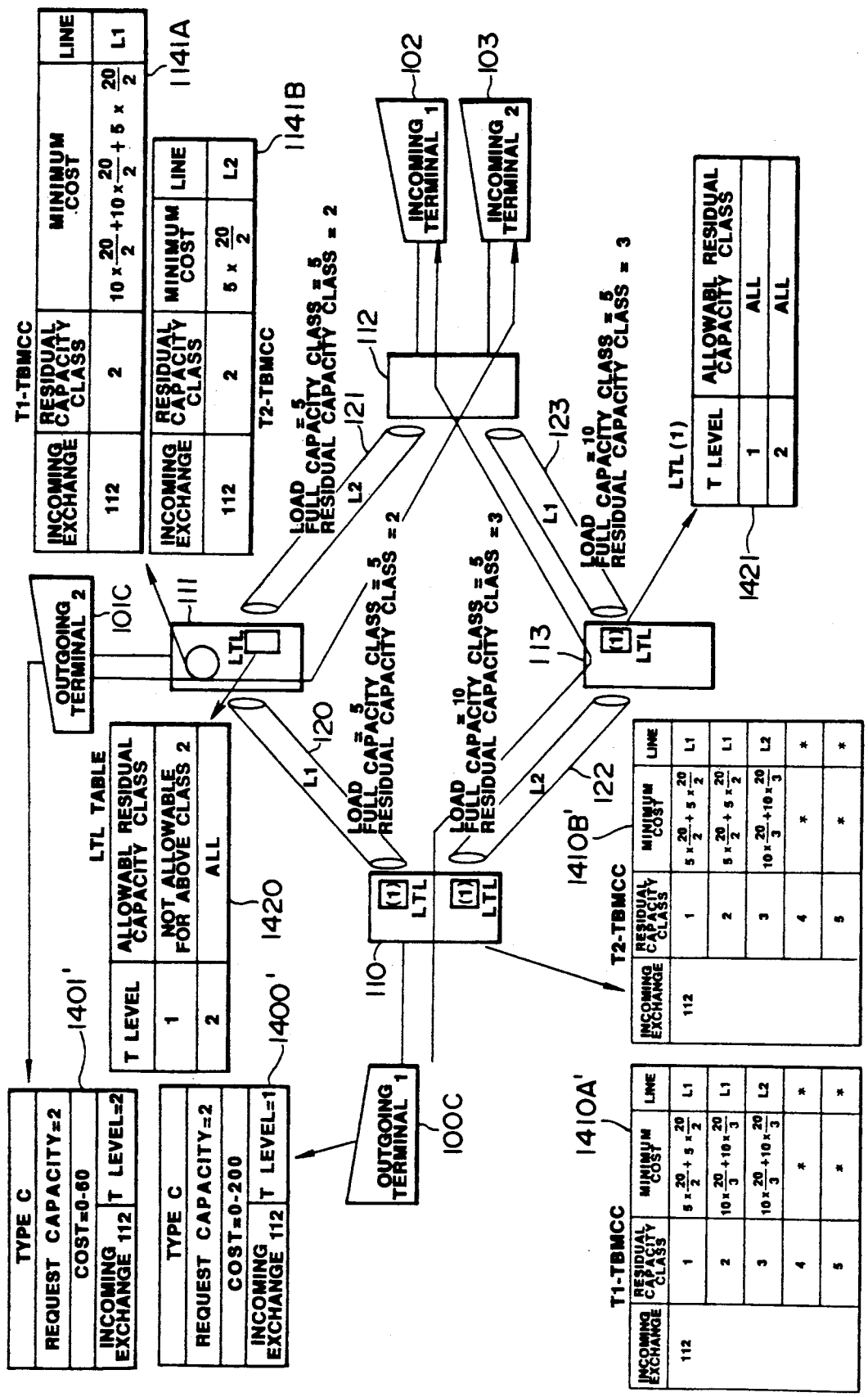
FIG. 17 is a configuration of a congestion avoidance control system based on the terminal priority level in accordance with a fourth embodiment of the present invention.

In FIG. 17, with respect to residual capacity class 2 for example, since the exchange 111 has an LTL table of $T_jT$ level 1 unregistrable for terminals of allowable residual capacity classes 2 and more and also has a residual capacity class of 2, the minimum cost table T1-TBMCC of the exchange 111 corresponds to a table 1411A; while, since the exchange 111 has an LTC table of $T_jT$ level 2 registrable for all terminals, the minimum cost table T2-TBMCC of the exchange 111 corresponds to a table 1411B.

In the exchange 113, a minimum cost value of "10×20/3" for both $T_jT$ levels 1 and 2 and the line L1 (line 123) are stored.

With respect to the exchange 110, at the $T_jT$ level 1, a cost vector value of "10×20/3+10×20/3+5×20/2+5×20/2" is input from the line L1 (line 120) and a cost vector value of "10×20/3+10×20/3" is input from the line L2 (line 122), so that the exchange 110 has a table 1410A' stored as the minimum cost table T1-TBMCC having a minimum cost value of "10×20/3+10×20/3" for the line L2 (line 122). At the $T_jT$ level 2, on the other hand, the exchange 110 similarly has a table 1410B' as the minimum cost table T2-TBMCC having such contents stored as illustrated.

With respect to residual capacity classes 1, 3, ..., the minimum cost tables T1-TBMCC and T2-TBMCC for the exchange 110 are prepared according to the similar procedure.

Under such a condition, if a calling request having a line request capacity of 2, a $T_jT$ level of 1 and an allowable cost of 0-200 is issued from the outgoing terminal 100C to the incoming terminal 102, then each of the relay exchanges selects one of routes according to a flowchart of the route decision procedure of FIG. 15 and on the basis of the contents of residual capacity class 3 satisfying the allowable cost 0-200 of the minimum cost table T1-TBMCC. As a result, the system can select one of routes, that is, outgoing terminal 100C→ exchange 110→ line 122→ exchange 113→ line 123→ exchange 112→ incoming terminal 102.

During communication through the relay lines of the thus-selected route, when a calling request having a line request capacity of 3, an allowable cost of 0- 200 and a $T_jT$ level of 2 is issued from the outgoing terminal 100C to the incoming terminal 102, the system can select a route of outgoing terminal 100C→ exchange 110→ line 122→ exchange 113→ line 123→ exchange 112→ incoming terminal 102, since each of the relay exchanges selects one of routes according to a flowchart of the route decision procedure of FIG. 15 and on the basis of the contents of residual capacity class 3 satisfying the allowable cost 0-200 of the minimum cost table T2-TBMCC.

Any combination of the aforementioned first, second and third methods can be realized to provide predetermined effects.

What is claimed is:

1. A congestion avoidance control system for a communication network having a plurality of exchanges interconnected by a plurality of lines for deciding one of communication routes leading from outgoing one of said plurality of exchanges including an outgoing terminal to incoming one thereof including an incoming terminal, each of said exchanges comprising:
   every-line residual-capacity minimum-cost memory means for storing one of a plurality of line residual capacity classes of line capacity units corresponding to a full line capacity of its own exchange minus a line capacity being now used thereof as a residual line capacity, minimum cost one of lines forming the routes leading from its own exchange to the incoming exchange, and a minimum cost value;
   retrieval means, when a calling request having a request use capacity as an application data is issued from said outgoing terminal, for retrieving said minimum cost line of one of the line residual capacity classes satisfying said request use capacity from said every-line residual-capacity minimum-cost memory means;
   decision means for deciding one of the communication routes on the basis of the minimum cost line retrieved by said retrieval means; and
   correction means for correcting the minimum cost value of said every-line residual-capacity minimum-cost memory means with use of a reciprocal of a ratio of the own residual line capacity to an intra-network line full capacity multiplied by a line fixed load value.

2. A congestion avoidance control system for a communication network as set forth in claim 1, wherein said every-line residual-capacity minimum-cost memory means stores therein the minimum cost values of lines of routes leading from its own exchange to the incoming exchange and minimum cost line numbers providing said minimum cost values with respect to said line residual capacity classes and said incoming exchange.

3. A congestion avoidance control system for a communication network as set forth in claim 1, wherein said every-line residual-capacity minimum-cost memory means stores therein minimum cost lines in association with said line residual capacity classes with respect to the incoming exchange.

4. A congestion avoidance control system for a communication network as set forth in claim 1, wherein said correction means includes vector preparation means for preparing a minimum cost vector for control of line residual capacity by multiplying a reciprocal of a ratio of its own residual line capacity to said intra-network full line capacity by a line fixed load value to obtain a multiplication value and by adding said multiplication value to the minimum cost value stored in said every-line residual-capacity minimum-cost memory means, update means for updating the minimum cost value of said every-line residual-capacity minimum-cost memory means on the basis of said line residual-capacity control minimum-cost vector received from an adjacent exchange, and vector transmission means for transmitting the line residual-capacity control minimum-cost vector prepared by said vector preparation means.

5. A congestion avoidance control system for a communication network as set forth in claim 4, wherein said vector transmission means transmits said line residual-capacity control minimum-cost vector to said adjacent exchange when the residual capacity class or minimum cost is changed.

6. A congestion avoidance control system for a communication network as set forth in claim 4, wherein said vector transmission means transmits said line residual-capacity control minimum-cost vector to said adjacent exchange at intervals of a predetermined period.

7. A congestion avoidance control system for a communication network as set forth in claim 1, wherein said application data at the time of issuing said calling request includes one of cost values allowable for a route between the outgoing and incoming terminals, and said retrieval means retrieves a minimum cost line of maximum one of said line residual capacity classes having a minimum cost value in a range of said allowable cost values.

8. A congestion avoidance control system for a communication network as set forth in claim 1, wherein said application data at the time of issuing said calling request includes one of a plurality of use priority levels preset for the respective terminals as decision indexes of whether to preferentially use relay lines of the route leading to the incoming exchange, each of said exchanges has a use priority level memory means in which said plurality of use priority levels as the decision indexes of whether to allow call setting to lines of its own exchange are stored in association with the line residual capacities of the lines of the exchange, said every-line residual-capacity minimum-cost memory means stores therein the minimum cost lines of the incoming exchanges arranged according to said use priority levels, and said retrieval means retrieves minimum cost one of the lines of the line residual capacity classes associated with the use priority levels by making reference to the minimum cost lines of the use priority levels in said use priority level memory means.

9. A congestion avoidance control system for a communication network having a plurality of exchanges interconnected by a plurality of lines for deciding one of communication routes leading from outgoing one of said plurality of exchanges including an outgoing terminal to incoming one thereof including an incoming terminal, each of said exchanges comprising:

an every-line residual-capacity minimum-cost table for storing one of a plurality of line residual capacity classes of line capacity units corresponding to a full line capacity of its own exchange minus a line capacity being now used thereof as a residual line capacity, minimum cost one of lines forming the routes leading from its own exchange to the incoming exchange, and a minimum cost value;

retrieval means, when a calling request having a cost value allowable for a route between said outgoing and incoming terminals as an application data is issued from said outgoing terminal, for retrieving said minimum cost line of maximum one of the line residual capacity classes corresponding to a minimum cost value in a range of said allowable cost value from said every-line residual-capacity minimum-cost table; and decision means for deciding one of the communication routes on the basis of the minimum cost line retrieved by said retrieval means.

10. A congestion avoidance control system for a communication network having a plurality of exchanges interconnected by a plurality of lines for deciding one of communication routes leading from outgoing one of said plurality of exchanges including an outgoing terminal to incoming one thereof including an incoming terminal, each of said exchanges comprising:

means for preparing a use priority level table in which a plurality of use priority levels as the decision index of whether to allow call setting to lines of its own exchange are stored in association with the line residual capacities of the lines of the exchange, an every-line residual-capacity minimum-cost table for storing one of a plurality of line residual capacity classes of line capacity units corresponding to a full line capacity of its own exchange minus a line capacity being now used thereof as a residual line capacity, minimum cost one of lines forming the routes leading from its own exchange to the incoming exchange, a minimum cost value, and also the minimum cost lines of the incoming exchanges arranged according to said use priority levels;

retrieval means, when a calling request having one of said use priority levels as an application data is issued from said outgoing terminal, for retrieving minimum cost one of the lines of the line residual capacity classes associated with the use priority levels by making reference to the minimum cost lines of the use priority levels in said use priority level table; and decision means for deciding one of the communication routes on the basis of the minimum cost line retrieved by said retrieval means.

11. In a route decision system for a communication network wherein a plurality of exchanges are interconnected by a plurality of lines, each of a plurality of exchanges stores, in an every-line residual-capacity minimum-cost table, one of a plurality of line residual capacity classes of line capacity units corresponding to a full line capacity of its own exchange minus a line capacity being now used thereof as a residual line capacity, a line number of minimum cost one of lines forming the routes leading from its own exchange to the incoming exchange, and a minimum cost value, and, when a calling request having a request use capacity as an application data is issued from said outgoing terminal, each of the exchanges retrieves said every-line residual-capacity minimum-cost table to sequentially extract said minimum cost line of one of the line residual capacity classes satisfying said request use capacity and determines one of relay routes for tandem connection between the incoming and outgoing terminals minimizing a sum of the costs of the relay route lines;

a congestion avoidance control method wherein each of said exchanges calculates an addition value to a previous minimum cost value at the time of updating the minimum cost value in said every-line residual-capacity minimum-cost table according to a calculation equation by multiplying a line resistive value indicative of a reciprocal of a ratio of the residual capacity value of its own line to an intra-network capacity value by a fixed load value of the line to make relatively low a cost of a line having a relatively large residual capacity and thereby to make it difficult to select the line having a small residual capacity.

12. A congestion avoidance control method as set forth in claim 11, wherein each terminal has a function of informing an outgoing exchange of, at the time of issuing said calling request, an application data including said request use capacity and one of cost values allowable for a route between the outgoing and incoming terminals, and when the calling request having said application data is issued from the outgoing terminal, each of the exchanges up to the incoming terminal and associated with route decision retrieves said every-line residual-capacity minimum-cost table with respect to the minimum cost lines of all the line residual capacity classes satisfying said request use capacity, and selects one of the routes forming minimum cost lines of maximum one of said line residual capacity classes having a minimum cost value in a range of said allowable cost values contained in the application data issued from the outgoing terminal.

13. A congestion avoidance control method as set forth in claim 11, wherein each terminal has a function of informing an outgoing exchange of, at the time of issuing said calling request, said application data including said request use capacity and one of a plurality of use priority levels preset for the respective terminals as decision indexes of whether to preferentially use relay lines of the route leading to the incoming exchange, each of said exchanges has a use priority level table in which said plurality of use priority levels as the decision index of whether to allow call setting to lines of its own exchange are stored in association with the line residual capacities of the lines of the exchange, said every-line residual-capacity minimum-cost table stores therein the minimum cost lines of the incoming exchanges arranged according to said use priority levels, and when a calling request having said application data is issued from said outgoing terminal, each of the exchanges associated with route decision to the incoming terminal selects one of the routes forming minimum cost lines of maximum one of said line residual capacity classes associated with the use priority levels by making reference to the minimum cost lines of the use priority levels of said use priority level table contained in the application data issued from the outgoing terminal to prevent a calling request having the request use capacity exceeding a predetermined value to flow through a relay line having a decreased line residual capacity.

* * * * *